Patented Sept. 4, 1951

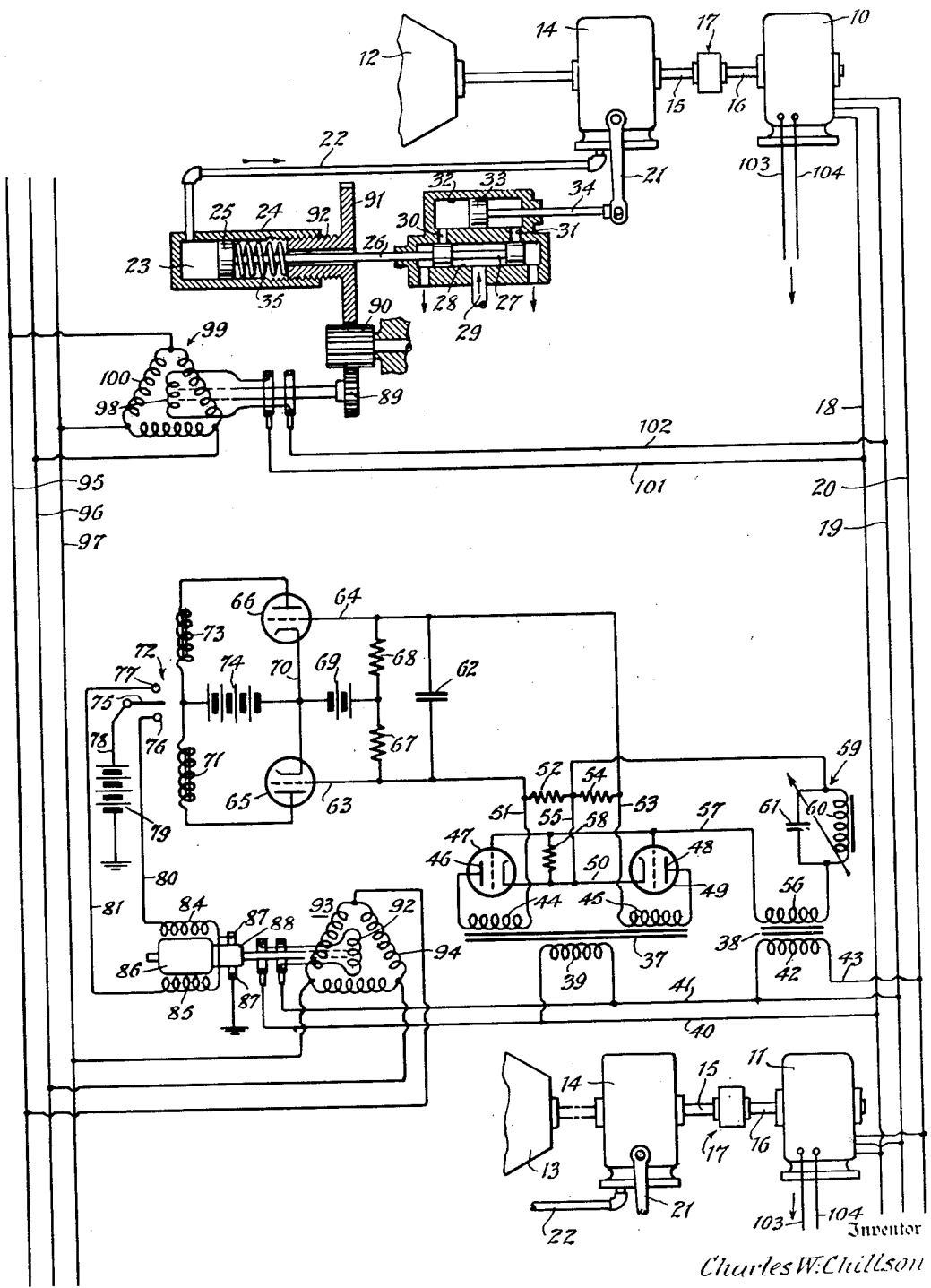

2,566,694

UNITED STATES PATENT OFFICE 2,566,694

ALTERNATOR CONTROL

Charles W. Chillson, Upper Montclair, N. J., assignor to Curtiss-Wright Corporation, a corporation of Delaware Application May 26, 1945, Serial No. 595,906

9 Claims. (Cl. 171—119)

This invention relates to a system for generating electric current, being concerned more particularly with a system characterized by a plurality of parallel-connected generators, each of which is driven by a separate source of power.

One object of the invention is a system of the character generally described wherein provision is made for controlling the operation of the generators in such a manner that they will be driven in synchronism at the selected speed regardless of variations in the angular velocity of the power sources and regardless of whether the power sources are synchronized, the load being equally divided among the operative generators and the frequency of the line being automatically controlled in applications where the generators are in the form of alternators.

A further object is to provide a system wherein each generator will remain continuously on the line running at the selected speed, and without loading up as a motor, when the power source to which it is connected is rotating at an angular velocity slower than the minimum required to drive the generator at the selected speed with said generator supplying electrical power.

A still further object is to provide a system wherein the generators are employed in such a manner that, when one fails, its load will be assumed by, and equally divided among, the remaining operative generators.

A still further object is a novel arrangement of the component parts of the system, whereby to obtain simplicity in design and dependability in operation.

The single figure of the drawing is a diagrammatic illustration of a system embodying the features of the invention.

The system, as illustrated, includes generators 10 and 11, each being employed in connection with an independent power source. The latter are sufficiently indicated for the purpose in view by a partial showing of engine drives 12 and 13, respectively, it being understood in this connection that additional generators and power sources may be availed of, if desired.

Power from each engine drive is transferred to the respective generator by a continuously variable-speed transmission 14. The drive shaft 15 of each transmission and the rotor shaft 16 of the associated generator are preferably connected by a uni-directional coupling 17 so as to prevent loading up of the generator as a motor in the event that the speed of the engine drive is lower than that required to keep the generator running at a speed as high as that of the other generator, or generators. The use of uni-directional couplings for the purpose and in the manner described has the further advantage that all of the generators may remain floating on the line running at synchronous speed even though they may not be serving as generators.

The generators 10 and 11 are connected in parallel and may be, and preferably are, multiphase alternators, the load lines to which they are connected being indicated at 18, 19 and 20.

The variable-speed transmissions 14 may be of any suitable type, each including a speed-control lever 21 and a line 22 in which a pressure proportional to alternator torque is developed, assuming the transmissions to be of a hydraulic type. The line 22 communicates with a chamber 23 in one end of a cylinder 24, the pressure developed in the said chamber acting against a piston 25 which is connected by a rod 26 to a valve 27. The latter is located in a chamber 28 and is adapted to control the flow of actuating fluid from a line 29, through either of two ports 30 and 31, into a chamber 32 and in so doing control the position of a piston 33, and hence the position of the control lever 21 to which the piston is connected by a rod 34. A spring 35, which is located in the cylinder 24 behind the piston 25, acts against the latter in such a manner that when the generator is supplying its proportion of the electrical power the pressure which the spring exerts against the piston 25 will be balanced by the pressure in the chamber 23. Under such circumstances the valve 27 will be held in a neutral position and the piston 33 will be held against movement. However, when the generator torque falls below the desired value, indicating that it is delivering less than its share of the electrical load and there is a corresponding reduction in the pressure in the chamber 23, the spring 35 will be operative to move the valve 27 in a direction which will permit fluid under pressure to enter the chamber 32 through the port 30. The piston 33 will thereupon be moved in a direction which will advance the lever 21 in the direction tending to increase the torque driving the generator so as to advance the electrical phase of said generator so that it again supplies its share of the electrical load, the fluid in the chamber 32 at the opposite side of the piston 33 escaping through the port 31. On the other hand, if the torque driving the generator should be too high so that the generator delivers more than its share of the electrical load, the pressure developed in the chamber 23 will be high enough to move the piston 25, against the action of the spring 35, in a direction tending to decrease the torque driving the generator. In this case the valve 27 will be moved so that fluid from the line 29 will enter the chamber 32 through the port 31, the fluid in the chamber at the opposite side of the piston escaping through the port 30. In this manner, each of the generators will be made to supply its share of the load, the share of the load being determined, for each individual generator, by the adjustment of its corresponding control spring 35. When the arrangement involves the use of synchronous alternator type generators, the aforementioned torque control means will maintain all generators at the same synchronous speed.

In applications where the generators are of the synchronous alternator type, the angular velocities of the generators will all be made the same by the control means described above. It is a further part of this invention to propose, for such an arrangement, a means by which this common angular velocity of all generators may be kept at a given specified value so that the electrical output will be of the desired frequency at all times. The said means may take any suitable form. As shown, it comprises a frequency discriminating network 36. The latter, in order that it may respond to deviations in the load line frequency, includes transformers 37 and 38, the primary 39 of the former being connected across the load lines 18 and 19 by lines 40 and 41, respectively, while the primary 42 of the transformer 38 is connected across the load lines 19 and 20 by the line 41 and a line 43. The transformer 37 includes series-connected secondaries 44 and 45. One side of the former is connected to the anode 46 of an electron tube 47 while the opposite side of the secondary 45 is connected to the anode 48 of a similar tube 49, the two tubes having a common cathode line 50. The secondaries 44 and 45 are connected by a bridge, one line 51 of which includes a resistance 52 and a second line 53 of which includes a similar resistance 54, a line 55 which connects the two lines of the bridge being connected to the cathode line 50 and also leading to one side of a secondary 56 of the transformer 38. The other side of the secondary 56 is connected by a line 57 to the grids of the tubes 47 and 49 and through a resistance 58 to the cathode line 50. The line 55 includes a parallel resonant circuit 59. The inductance and capacity of the coil 60 and condenser 60 and 61, respectively, thereof are predetermined so that the parallel circuit will resonate to the frequency of the load line when such frequency is correct, the coil and condenser, either or both, preferably being adjustable so that the parallel circuit may be tuned throughout a resonant range corresponding to the contemplated range of frequencies that the alternators may be called upon to generate.

It will be apparent from the foregoing that one phase of the line frequency is, through the transformer 37 impressed upon the anodes of the tubes 47 and 49 while a second phase of the line frequency is utilized to excite the grids of the said tubes. Assuming the two phases utilized in the manner described to be ninety degrees apart, or if the lines 18, 19 and 20 be three-phase, a "T" connection is used to supply such two-phase current, it will be apparent that the voltages impressed on the anodes 46 and 48 will be 180 degrees out of phase and hence that when the parallel circuit 59 is resonant, the voltage on the grid of the tube 47 will lead the voltage on the anode 46 by 90 degrees while the voltage on the grid of the tube 49 will lag the voltage on the anode 48 by 90 degrees. Under such circumstances, therefore, the flow of current through the anode circuits will be equal, as will the voltages across the resistances 52 and 54. Any deviation of the generator frequency, however, assuming the tuning of the parallel circuit 59 remains unchanged, will result in a phase shift in the parallel circuit and hence will cause an unequal phase relationship to exist between the grids of the tubes 47 and 49 and the respective anodes. The flow of current through the anode circuits of the two tubes will change accordingly, as will the voltages across the resistances 52 and 54, the relation of the voltages across the said resistances depending upon whether the line frequency is higher or lower than the resonant frequency of the parallel circuit and upon the magnitude of the frequency deviation.

Thus the net voltage across the lines 51 and 53, which is zero when the line frequency corresponds to the resonant frequency of the parallel circuit, may be caused to vary, over a predetermined range, directly as the difference between the line frequency and the desired frequency, the voltage drop being in one sense when the line frequency is higher than desired and in the opposite sense when the line frequency is lower. As the resonant frequency of the parallel circuit 59 corresponds to the desired generator speed and as the line frequency corresponds to the actual speed, the voltages developed across the lines 51 and 53 will be proportional to off-speed variations of the generator. In this connection it is to be understood that, if desired, a series resonant circuit may be substituted for the parallel circuit for phase shifting purposes and that a condenser 62 may be connected across the lines 51 and 53 to attenuate the undesirable high frequencies.

Lines 63 and 64 connect the output of the phase-sensitive bridge to the grids of relay tubes 65 and 66, series-connected bias resistors 67 and 68 for the said grids being connected across the lines 63 and 64. A battery 69, which is connected between the resistors and the cathode line 70 of the tubes, provides a fixed bias for the tubes. The anode circuit of the tube 65 includes a coil 71 of a relay 72 while the anode circuit of the tube 66 includes a similar coil 73, a battery 74 furnishing current for the anode circuits. The tubes 65 and 66 are similarly biased so that when the signal voltage is zero the flow of current through the anode circuits will cause the coils 71 and 73 to oppose one another in such a manner that a movable contact member 75 will be held in the neutral position shown, out of engagement with fixed contacts 76 and 77.

In the event however, that the grids of the relay tubes are biased to a different degree, the flow of current through the relay coils 71 and 73 will no longer be equalized and the contact member 75 will be moved into engagement either with the contact 76 or the contact 77, depending upon the difference between the signal voltages impressed upon the grids of the tubes 65 and 66.

The movable contact member 75 of the relay 72 is connected by a line 78 to one side of a battery 79, the opposite side of which is grounded. Lines 80 and 81 connect the contacts 76 and 77 to oppositely wound field coils 84 and 85, respectively, of a motor 86 and the opposite sides of the field coils being connected to one of a set of brushes 87. Another of the said brushes is grounded, the commutator of the motor being indicated at 88. An extension of the armature shaft of the motor drives the rotor 92 of a selsyn transmitter 93 which corresponds mechanically to a wound rotor induction motor. The stator 94 of the selsyn 93 is connected to signal leads 95, 96 and 97 extending to the power plants 12 and 13 and others as may be employed where, as is illustrated in conjunction with power plant 12, the rotor 98 of selsyn motor 99, being excited by the stator 100 connected to the lines 95, 96 and 97, causes the gear 89 to rotate in synchronism with motor 86 and the rotor 92. The rotor 92 and rotor 98, and other rotors as may be employed with power plant 13 and others are connected to a common source of power, which, for convenience, may be one phase 18 and 19 of the power line as represented by lines 18, 19 and 20, rotor 92 being so connected through slip rings and extension of lines 40 and 41, and rotor 98 being similarly connected through tap lines 101 and 102. The gear 89 meshes with an idler gear 90 which, in turn, meshes with a gear 91. A threaded hub 92 on the gear 91 screws into an end of the cylinder 24 and provides a seat which may be adjusted to vary the pressure which the spring is caused to exercise upon the piston 25.

It will thus be apparent that when the contact member 75 engages the contact 76 the field coil 84 of the motor 86 will be energized to cause rotation of the armature of the motor in one direction while when the contact member engages the contact 77 the field coil 85 will be energized to cause rotation of the armature in the opposite direction, which rotation is synchronously repeated in each selsyn motor such as 99. It will be noted that the axial extent of the gear 90 is such that it will mesh with the gear 91 throughout the contemplated range of adjustment of the latter, that the ratios of the gears of the train may be varied, and that the gear carried by the armature shaft of the motor 86 may mesh directly with the gear 91 if the use of an intermediate, or idler gear, is not desired but that the mechanism at each power plant will be the same, if it be desired to equalize the load carried by each power plant. Any deviation in the line frequency will, therefore, result in the motor 86 being energized in a manner and for a period such that power plant control levers 21 of the transmissions at each power plant will be adjusted to alter the torque applied to the generators to a degree necessary to cause the generators to be driven at the proper speed.

The generator 11, and any other generators included in the system, are controlled in the same manner as the generator 10, the transmission by which each such generator is connected to its power source being controlled both in response to alternator torque and the frequency output of the load lines. The motor 86 and the selsyn repeating motors employed in connection with each of the other generators of the system being all controlled by the relay 72, the response of the gear trains to deviations in the output of the load lines will be simultaneous and similar and as the same frequency discriminating network controls the action of all of the motors, any changes in the adjustment of the transmissions to obtain, or maintain, a given electrical output frequency, may be effected without causing variations in the relative distribution of the electrical load among the different generators.

In other words, each transmission is individually responsive to the torque acting on the generator which it drives to cause the generator to carry its share of the load. Also the various transmissions are simultaneously responsive to any deviation in the output frequency of the load lines with respect to a predetermined output frequency whereby to maintain the generators running at the desired speed.

The system has the further advantage that all of the generators run at the same speed regardless of whether or not they are being driven by their engines, thereby simplifying synchronizing and cutting-in operations. Further, by proper control of the field excitation of the alternators, the lines 103 and 104 being for this purpose, the power factor of the system may be improved by utilizing any undriven generator as a synchronous condenser.

In synchronizing the speed of the generators, the system is automatically operative to compensate for any instability resulting from variations in load. For example, assuming the generators to be running at a speed corresponding to the desired frequency, suppose an increase in the load to occur. If such load increase should cause any additional slip in the variable transmissions, and consequently a decrease in the line frequency, the system will be operative, in response to such frequency deviation, to act upon all of the springs 35 in such a manner that the control levers of the transmissions will be moved simultaneously in a direction to increase the speed of the generators. In the event that one engine should fall below speed with a resultant decrease in the load upon the generator driven by such engine, the spring 35 of the particular control will be operative to increase the output speed until the torque load attains the proper value. If an engine should stop, thereby removing the driving torque from the associated generator, within the limits of its speed range, the control lever of the associated transmission will be shifted to give the highest possible output speed, there being no torque acting on the generator. However, as the engine is not delivering power the generator, acting now as a freely running motor, simply turns at synchronous speed at no load and will be ready for further use when the engine is again started. The removal of one generator from the line corresponds to an increase in the load on the line, in so far as the remaining generators are concerned; and in such case the system will be operative, in response to the resultant decrease in the speed of the operative generators, to advance the control levers of the transmissions associated with said generators and in so doing increase their speed in the manner described.

It is to be noted that the system is not limited with respect to the type of power source and that variations in the rate of operation of the power sources may occur without causing a change in the speed of the driven generators. The system may, therefore, be employed to particular advantage in connection with multi-engine aircraft. When so employed the total generator load will be equally divided among the engines of the aircraft and the engines will be operative to drive the generators at, and maintain them at, a speed corresponding to a predetermined frequency throughout the operating range of the engines and despite variations in relative speeds of the engines. In the event one engine should fail, the system is automatically operative to cause the remaining engines to carry the full load, the generator connected to the inoperative engine remaining on the line and running at synchronous speed.

The form of the invention herein illustrated and described is by way of example only. Various adaptations thereof and various other forms may be availed of without departing from the scope and spirit of the invention.

I claim:

1. A power generating system including a plurality of alternating current generators connected in parallel to a common load line, a source of power for each generator, a variable-speed transmission connecting each generator to its source of power for delivering predetermined torque to said generator, means for individually controlling said transmissions so that despite variations in the rate of operation of said power sources each of said generators will be caused to carry a predetermined share of the load on said line, and means responsive to the line frequency for simultaneously further controlling all of said transmissions with respect to a fixed frequency, whereby to maintain said generators at a predetermined synchronous speed despite variations in said load.

2. A power generating system including a plurality of generators connected in parallel to a common load line, a source of variable power for each generator, a variable-speed transmission connecting each generator to its source of power, means responsive to the torque acting on each generator for controlling the transmission by which said generator is connected to its source of power to the end that each generator will be caused to carry a predetermined share of the load on said line, and electrical means responsive to variation in a load manifestation of said load line with respect to a reference value for simultaneously further controlling all of said transmissions, whereby to maintain said generators at a predetermined speed despite variations in said load and in the rate of operation of said power sources.

3. A power generating system including a plurality of alternators connected in parallel to a common load line, a source of variable power for each alternator, a variable-speed transmission connecting each alternator to its source of power, means responsive to the torque acting on each alternator for controlling the transmission by which said alternator is connected to its source of power to the end that each alternator will be caused to carry a predetermined share of the load on said line, and electrical means responsive to the output frequency of said load line for simultaneously further controlling all of said transmissions with respect to a fixed frequency, whereby to maintain said alternators at a speed corresponding to said fixed frequency despite variations in said load and in the rate of operation of said power sources.

4. A power generating system including a plurality of alternators connected in parallel to a common load line, a source of variable power for each alternator, a variable-speed transmission connecting each alternator to its source of power, means responsive to alternator torque for controlling each transmission, said torque responsive means being adjustable so that the driven alternator will be caused to carry a predetermined share of the load on said line, a motor for further varying the action of each torque responsive means, and means responsive to deviations in the load line frequency with respect to a selected frequency for simultaneously controlling the operation of all said motors, whereby to maintain said alternators at a speed corresponding to said selected frequency.

5. A power generating system including a plurality of generators connected in parallel to a common load line, a source of variable power for each generator, a variable-speed transmission connecting each generator to its source of power, a control element for each transmission, means associated with each transmission for developing a pressure proportional to the load on the generator driven by said transmission, said pressures acting against said control elements respectively, means associated with each transmission for developing a predetermined counter pressure, said elements being jointly responsive to said pressures and said counter pressures respectively to control the corresponding transmissions individually so that each generator will be caused to carry a predetermined share of the load on said line, motors for varying said counter pressures respectively, and electrical means responsive to variation in a load manifestation of said load line with respect to a reference value for simultaneously controlling the operation of all said motors, whereby to maintain said generators at a speed corresponding to a predetermined output.

6. A power generating system including a plurality of alternators connected in parallel to a common load line, a source of variable power for each alternator, a variable-speed transmission connecting each alternator to its source of power, means associated with each of said transmissions for developing a pressure proportional to the load on the alternator driven by said transmission, a control element for each transmission, resilient means associated with each transmission for developing a counter pressure, said elements being responsive to said pressures and said counter pressures to control said transmissions individually so that each alternator will be caused to carry a predetermined share of the load on said line, individual motors for varying the counter pressures developed by said resilient means respectively, and means responsive to deviations in the output frequency of said load line with respect to a selected frequency for simultaneously controlling the operation of all said motors, whereby to maintain said alternators at a speed corresponding to said selected frequency.

7. A power generating system including a plurality of generators connected in parallel to a common load line, a variable speed prime mover for each generator, a variable speed transmission between each generator and its prime mover adapted to control the driving torque of said generator, regulating means operatively associated with each transmission and jointly controlled according to actual developed torque and a predetermined torque value for regulating said driving torque so that the respective generator carries its share of the common load, and electrical means connected to said load line and responsive to variation in a common load manifestation with respect to a reference value for simultaneously modifying in like degree the operation of all said regulating means whereby the respective generators are maintained at a predetermined speed despite variations in the common load and the speed of said prime movers.

8. A power generating system including a plurality of alternators connected in parallel to a common load line, a variable speed prime mover for each alternator, a variable speed transmission between each alternator and its prime mover adapted to control the driving torque of said alternator, regulating means operatively associated with each transmission and jointly controlled according to actual developed torque and a predetermined torque value for regulating said driving torque so that the respective alternator carries its share of the common load, and electrical means connected to said load line and responsive to variation in load frequency with respect to a reference frequency for simultaneously modifying in like degree the operation of all said regulating means so as to adjust the respective predetermined torque values whereby the respective alternators are maintained at a predetermined speed despite variations in the common load and the speed of said prime movers.

9. A power generating system including a plurality of generators connected in parallel to a common load line, a variable speed prime mover for each generator, a variable speed transmission of the fluid type between each generator and its prime mover adapted to control the driving torque of said generator, regulating means operatively connected with each transmission and jointly controlled according to fluid pressure from said transmission representing actual developed torque and a counter pressure representing desired torque for regulating said driving torque so that the respective generator carries its share of the common load, and electrical means connected to said load line and responsive to variation in a common load manifestation with respect to a reference value for simultaneously modifying in like degree the operation of all said regulating means for varying the respective desired torque values whereby the respective generators are maintained at a predetermined speed despite variations in the common load and the speed of said prime movers.

CHARLES W. CHILLSON.

REFERENCES CITED

The following references are of record in the file of this patent:

UNITED STATES PATENTS

| Number | Name | Date |
| --- | --- | --- |
| Re. 20,548 | Doyle | Nov. 9, 1937 |
| 2,021,753 | Suits | Nov. 19, 1935 |
| 2,349,334 | Armentrout | May 23, 1944 |